United States Patent
Khymych

(10) Patent No.: US 7,997,371 B2
(45) Date of Patent: Aug. 16, 2011

(54) AIRFLOW POWER INSTALLATIONS

(76) Inventor: Vasyl Khymych, Brooklyn, NY (US)

( * ) Notice: Subject to any disclaimer, the term of this patent is extended or adjusted under 35 U.S.C. 154(b) by 282 days.

(21) Appl. No.: 12/381,823

(22) Filed: Mar. 17, 2009

(65) Prior Publication Data

US 2010/0236230 A1   Sep. 23, 2010

(51) Int. Cl.
*B60K 16/00* (2006.01)
(52) U.S. Cl. .................................. 180/165; 180/2.2
(58) Field of Classification Search .................. 180/165, 180/2.1, 2.2, 302, 306
See application file for complete search history.

(56) References Cited

U.S. PATENT DOCUMENTS

| | | | | |
|---|---|---|---|---|
| 2,591,641 | A * | 4/1952 | Troendle | 137/102 |
| 5,680,032 | A * | 10/1997 | Pena | 290/52 |
| 6,054,838 | A * | 4/2000 | Tsatsis | 320/101 |
| 7,559,394 | B2 * | 7/2009 | Rask et al. | 180/165 |
| 7,810,589 | B2 * | 10/2010 | Frierman | 180/2.2 |
| 7,828,091 | B2 * | 11/2010 | Wedderburn et al. | 180/2.2 |

* cited by examiner

*Primary Examiner* — John Walters
(74) *Attorney, Agent, or Firm* — Aleksandr Smushkovich

(57) ABSTRACT

A power installation is proposed for conversion of airflow energy into compressed air energy used by a pneumo-motor or/and by an electro-generator associated with a control system. An embodiment of the installation comprises a number of turbine units arranged in box-sections serving as the walls and roof of a truck. The turbine unit includes X-shaped members supporting a shaft with a turbine driven by a resistance airflow appearing during movements of the truck. The rotation of the turbines is conveyed to a pump, charging a tank with compressed air, used for driving the truck. In embodiments the turbines' blades may comprise a load and may revolve in mutually opposite directions. The installation may include an additional compressor, or may include a first muff connecting the pneumatic motor to a power train, an additional fueled engine, and a second muff connecting the fueled engine to the power train.

5 Claims, 13 Drawing Sheets

AIRFLOW POWER INSTALLATIONS

FIELD OF THE INVENTION

The invention relates to the field of air-flow power conversion engineering, particularly to installations capable to convert wind airflow renewable energy and energy of airflows resisting the movement of transportation means into usable energy.

BACKGROUND OF THE INVENTION

There is known a 'compressed air engine system and method for generating electrical energy from the controlled release of compressed air' described in U.S. Pat. No. 5,553,454 (hereby entirely incorporated by reference) to Mortner, as follows: "A system and method is provided for generating electrical energy by operatively connecting a generator to a drive shaft which is rotated axially when fan turbines connected to the drive shaft are rotated. The turbines are rotated by directing the release of air under pressure toward a plurality of blade surfaces of the turbines. The air under pressure is supplied from a plurality of storage tanks which are connected to one of a pair of pressure guide rings, which guide rings receive air under pressure from one or more connected tanks and direct the air through an output duct and toward the blade surfaces. The flow of air under pressure is controlled by a power regulator and controller which monitors the power output from the generator and transmits electrical signals to adjust the open and closed positioning of a tank output valve on each of the plurality of tanks. Alternatively, the drive shaft may be connected to a water pump, evaporating device, or the drive wheels of a motor vehicle for pollution-free powering of that device through the controlled release of compressed air in the plurality of tanks." The abovementioned method contemplates using the already compressed air from storage tanks, though does not show how to obtain the compressed air.

On the other hand, there exists another problem of reduction of the air resistance experienced by a moving transportation means. A 'motor vehicle with flow-influencing devices to reduce air resistance' is taught in U.S. Pat. No. 6,378,932 (hereby entirely incorporated by reference) to Fasel et al: "A motor vehicle has an outer contour around which the headwind flows when driving has associated with it flow-influencing structure to reduce the air resistance of the motor vehicle is known. The flow-influencing structure are movably mounted in a vicinity of the outer contour and can be activated periodically with the aid of drive devices in order to introduce suitably time-dependent disturbances into the flow of the headwind in the vicinity of the flow-influencing structure." According to Fasel et al, the mentioned means are to reduce the airflow, though they don't teach, whether this airflow could generate energy.

Another example of a device for reducing the air resistance to a moving truck is disclosed in U.S. Pat. No. 6,736,447 (hereby entirely incorporated by reference) to Angelo et al entitled 'Ducted aerodynamic front section of a vehicle': "A truck front section (120) including a grill (128), a hood (121), and a bridge assembly (137) is provided. The grill has a substantially vertical front surface and an upper portion. The hood has an upper panel (121) with a sloping front end disposed adjacent the grill upper portion. The bridge assembly is disposed above the front end of the hood upper panel and has a pair of oppositely disposed upright end members (133) attached to the hood upper panel. The bridge assembly also has a substantially horizontal aerodynamically shaped member (138 and/or 140) attached to the end members. The upper portion of the grill, the front end of the hood upper panel and the bridge assembly cooperatively form a duct generally disposed above the grill. The duct may discharge into a longitudinal channel (112 and/or 114) formed in the upper panel." The 'Ducted aerodynamic front section' is also not concerned with generating energy.

As known, the resistance airflow (its pressure can be essentially proportional to the squared speed) may cause about 70-90% (depending on the speed) of losses of power developed by the engine of a transportation means. Therefore, on the one hand, the resistance airflow decelerates the motion of the moving transportation means and consumes an essential portion the engine's fuel that is wasted for overcoming the air resistance. On the other hand, the resistance airflow possesses its own energy that can and should be utilized.

BRIEF DESCRIPTION OF THE INVENTION

A primary aim of this invention is the designing of airflow power installations allowing for conversion and utilization of energy carried by resistance airflows impeding the motion of transportation means (preferably trucks), as well as for conversion and utilization of wind airflow energy. The conversion provides for a partial return of energy spent by the engine that significantly increases the energy effectiveness of the transportation means and reduces or even eliminates pollution of the environment. The conversion also provides for accumulation of airflow energy in the form of compressed air, which energy can then be utilized, for instance, when the airflow discontinues or essentially decreases. Thusly, the conversion in fact provides an alternative energy source for people needs. Other aims of the invention might become apparent to a skilled artisan upon learning the present disclosure.

Briefly stated, power installations versions are proposed herein for conversion of airflow energy by a turbine and a pump into compressed air energy used by a pneumo-motor or/and by an electro-generator associated with a control system. One installation comprises turbine units arranged in box-sections serving as walls and a roof of a truck. The turbine unit includes X-shaped members supporting a shaft with a turbine driven by resistance airflows appearing during the movement of truck. The rotation of turbine is conveyed to a pump, charging a tank with compressed air, which compressed air is mostly used for driving the truck. The tank is initially charged with compressed air from another energy source. Another installation additionally includes a conventional engine driving one pair of wheels, while the pneumo-motor drives the other pair of wheels. A stationary installation includes a shutter coupled with a wind vane configured for creation of an unevenly distributed airflow applied to the turbine, a gear, a pump, charging a tank with compressed air, and a brake mechanism for regulation of the turbine's speed.

Figure 1:
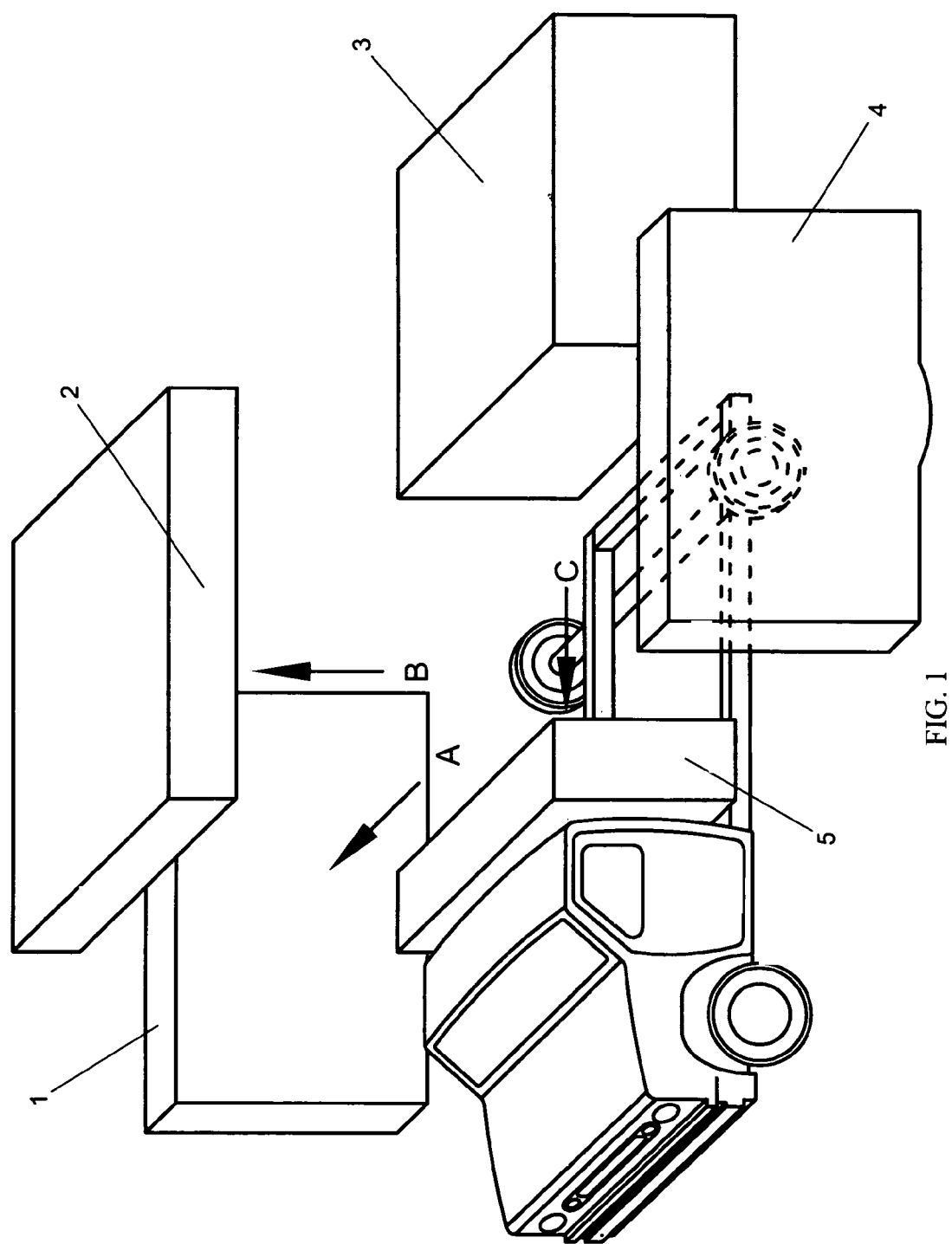
FIG. 1 is a schematic view of hollow box-sections mounted on a truck for accommodation of a truck power installation, according to a preferred embodiment of the invention.

Each reference numeral indicated on FIGS. 1-8 denotes an element of the inventive structures described herein below. Identical elements on different figures are denoted by identical reference numerals, unless otherwise stated in the description. A first time introduced reference numeral in the description is enclosed into parentheses.

DETAIL DESCRIPTION OF PREFERRED EMBODIMENTS OF THE INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Truck-Based Airflow Power Installation

Referring to a preferred embodiment of the present invention illustrated on FIG. 1, there is shown a truck-based airflow power installation (TBAPI), which comprises: a right turbine box-section (1), an upper turbine box-section (2), a cargo box-section (3), a left turbine box-section (4), and a compressor equipment box-section (5) mostly used for accommodation of air-compressor pumps, tanks for storage of compressed air, etc. The box-sections are immovably secured to the body of the transportation means, and form double-walls and double-ceiling in the truck; the space inside of the box-sections is used for accommodation of corresponding equipment of the power installation. In different truck-based embodiments, the installation may comprise 1, or 2, or 3, or 4, or 5 box-sections (or even more) that is at least one box-section. Respectively, the installation may include, for example, only the upper turbine, or the left or right or both turbines. In optional embodiments (not shown), the turbines can also be installed in any box-section located in a suitable place, e.g. in a floor box-section where appropriate, etc. Therefore, the walls of transportation means are utilized for containing units of the power installation. Alternatively, the box-sections can be located not necessarily in the double-walls, but in other parts of the transportation means.

Figure 2:
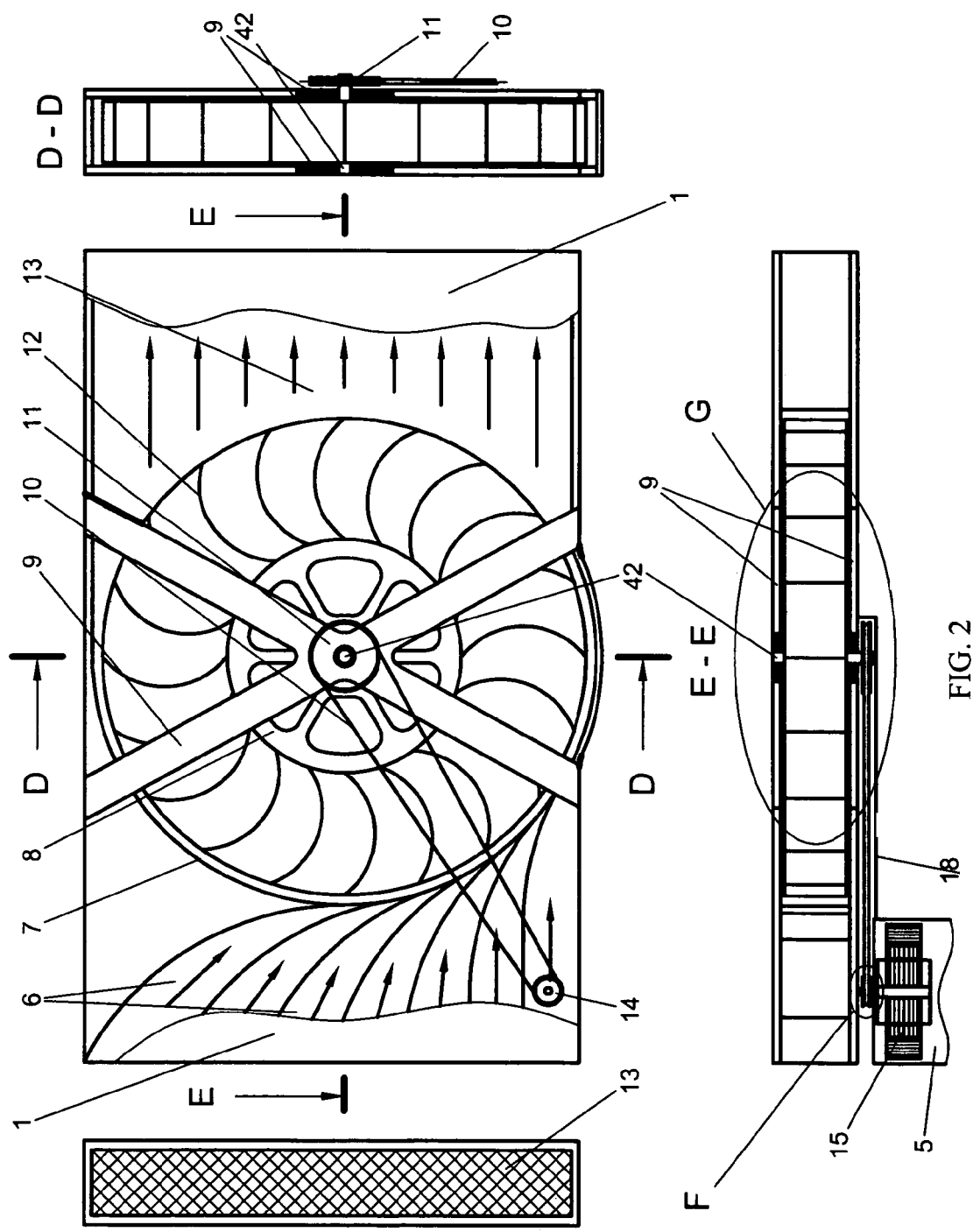
FIG. 2 is a front, side, and plan sectional views of a lateral (e.g. right-side) turbine box-section of the truck power installation, according to a preferred embodiment of the invention.

FIG. 2 illustrates a portion of the airflow power installation represented by a lateral turbine unit mounted in the right turbine box-section 1; a similar lateral turbine unit is preferably mounted in the left turbine box-section 4. The lateral turbine unit comprises: a vertically disposed turbine casing (7) preferably made in the form of a hollow disc having a predetermined diameter. The casing 7 is secured to the box-section 1. In some embodiments, the diameter of casing 7 can be greater than the height of the box-section 4, i.e. a certain segment of the casing 7 would protrude from the top and/or the bottom of casing 7.

As shown on FIG. 2, the lateral turbine unit comprises: a number of intake channels (6) formed in the forward part of the box-section 1. The intake channels 6 each includes an inlet opening located in a suitable place, preferably on the frontal surface of the truck, for receiving the ongoing resistance airflow that appears during the movement of the truck. At least one intake pressure sensor (not shown) is so mounted that capable to measure the airflow pressure at the entrance into the inlet opening. The intake sensor is associated with a control system (not illustrated) of the power installation.

As noted above, the resistance airflow sharply increases while the speed of the transportation means is growing. Therefore, the power installation is especially effective when the transportation means is moving with a high speed. Outlet openings of the intake channels 6 are preferably situated on a lower forward portion of the annular side-wall surface of the turbine casing 7. The channels 6 preferably have a curved shape narrowing from the inlet openings to the outlet openings.

The lateral turbine unit also comprises: a number of discharge channels (13), arranged in the backward part of the box-section 1. The discharge channels 13 each includes an inlet opening located on the rear surface of the casing 7 for exhaust of the airflow passed through the turbine unit. The exhausted airflow exits outside of the truck.

In a preferred embodiment depicted on FIG. 2, the lateral turbine unit comprises a pair of support structural members (9), preferably having an X-shape, immovably secured preferably to the body of the transportation means and to the lateral walls of the box-section 1.

The lateral turbine unit comprises support bearings disposed in the centers of the X-shaped support members, and a vertical turbine (8) fixed on a horizontally disposed turbine shaft rotatably mounted on the support bearings, the turbine 8 is mounted within the casing 7. The turbine 8 includes a flywheel (not shown), and a plurality of blades (12) having a predetermined aerodynamic shape. Preferably the blades can be made concaved from the side receiving the intake airflow. The turbine 8 has a predetermined diameter, and a suitable clearance between the ends of the blades 12 and the inner annular walls of the casing 7.

Optionally, at least a portion of the blade can be furnished with a load (e.g. having a heavy metal insertion, etc. shown on FIG. 3b) that can additionally perform the function of the flywheel, or even substitute it. While rotating, the flywheels and the aforesaid loads of the right and left turbine units may additionally help stabilizing the truck on sharp turns at high speed.

Figure 2A:
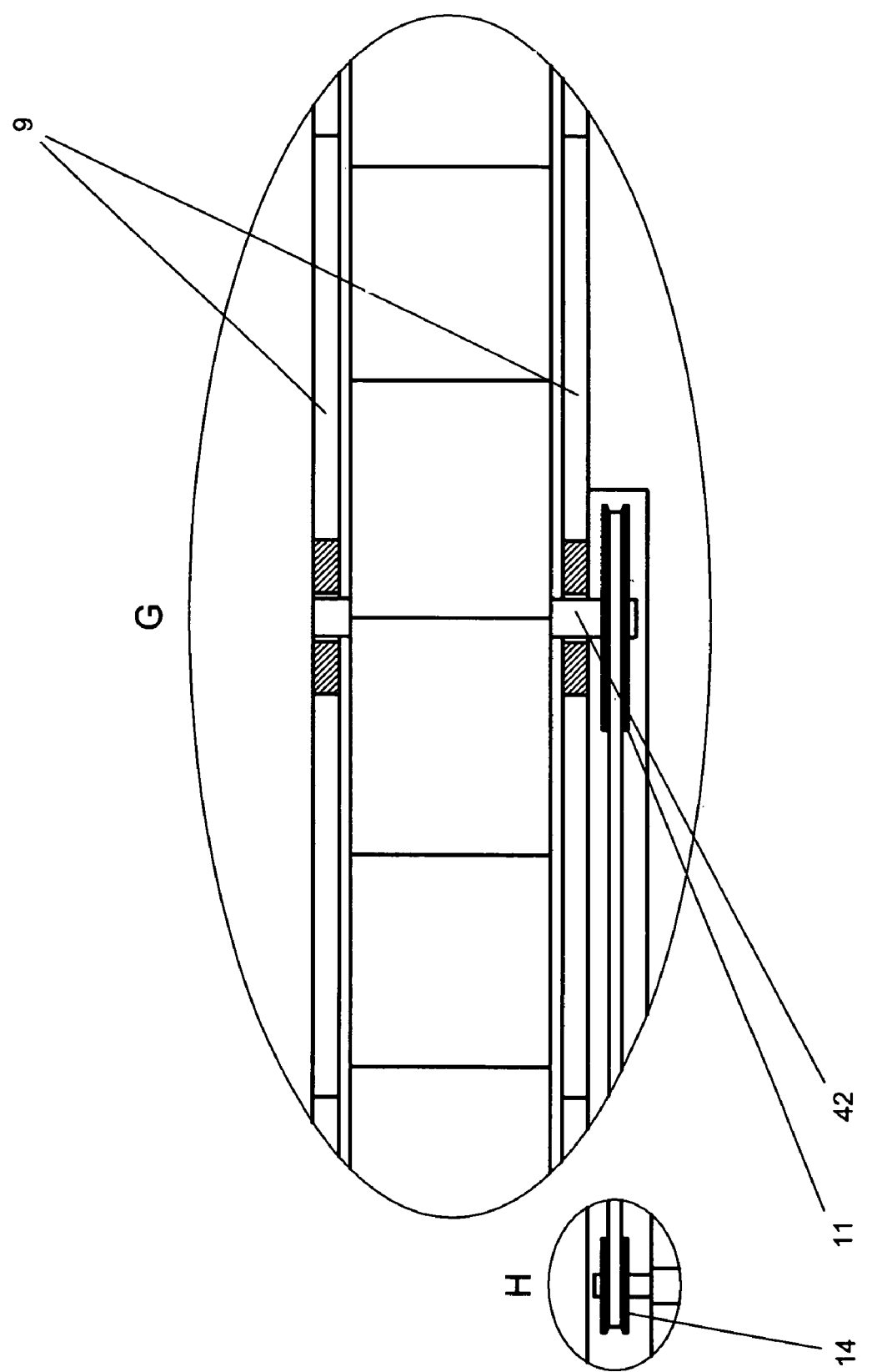
FIG. 2a is a detail sectional view of a fragment of the lateral turbine box-section, shown on FIG. 2.

The lateral turbine unit comprises a belt gear covered by a cover (18), and having a driving pulley (11) fixed on the turbine shaft, a driven pulley (14) preferably mounted at the bottom of the box-section 1, and a belt (10) associating the pulley 11 and pulley 14. FIG. 2a shows the belt gear in more detail.

Figure 3:
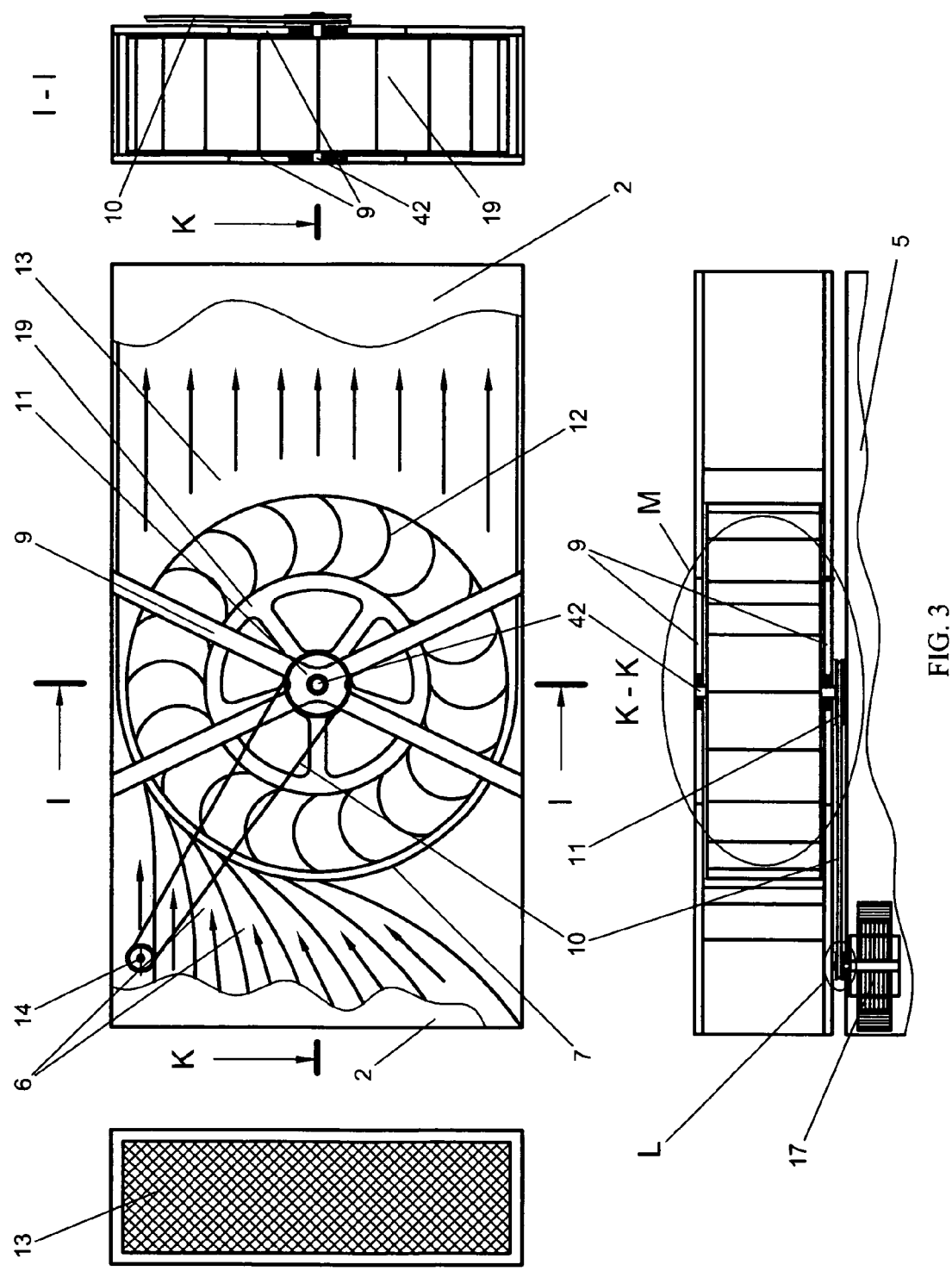
FIG. 3 is a front, side, and plan sectional views of an upper turbine box-section of the truck power installation, according to a preferred embodiment of the invention.
Figure 3A:
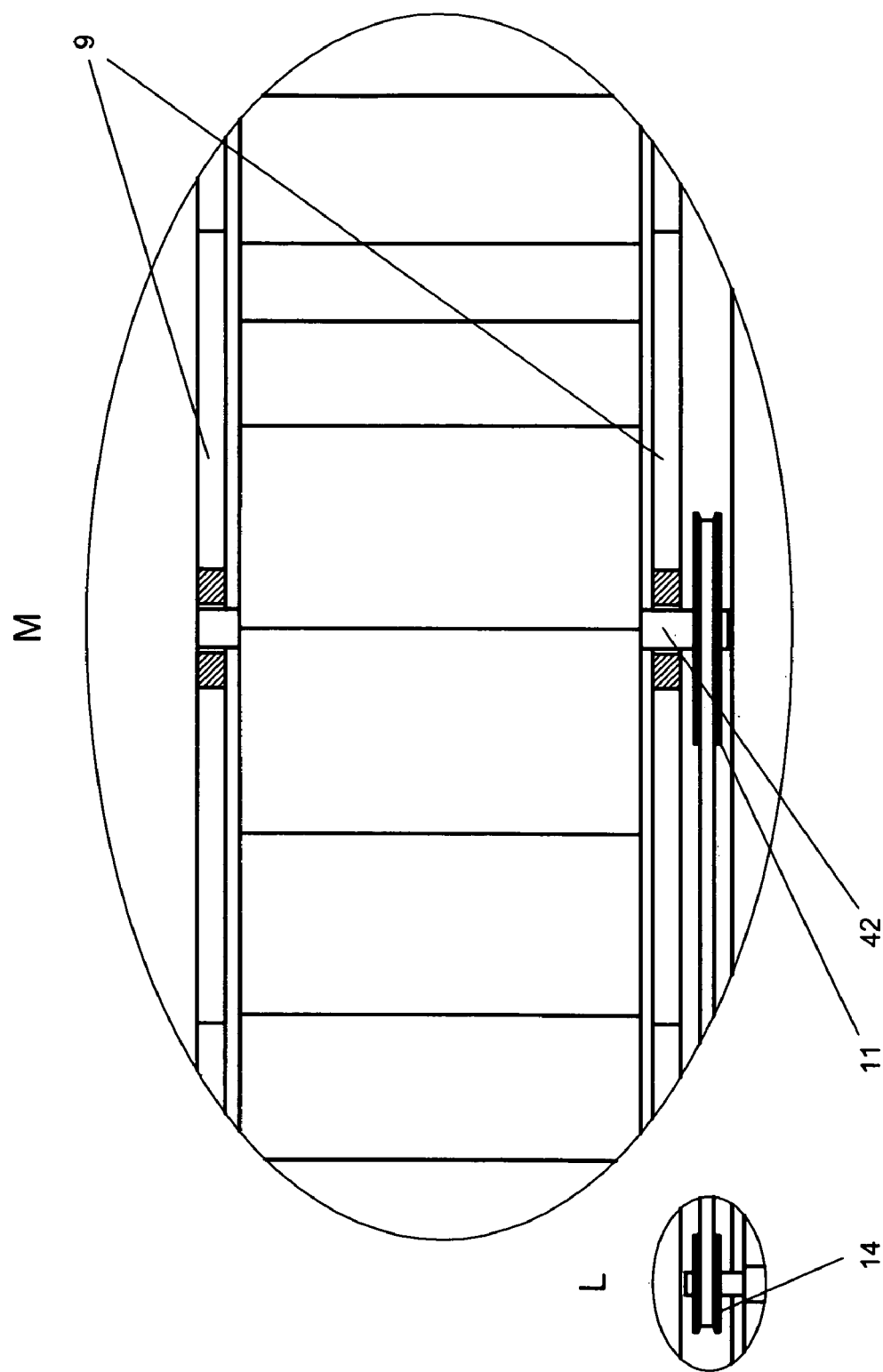
FIG. 3a is a detail sectional view of a fragment of the upper turbine box-section, shown on FIG. 3.
Figure 3B:
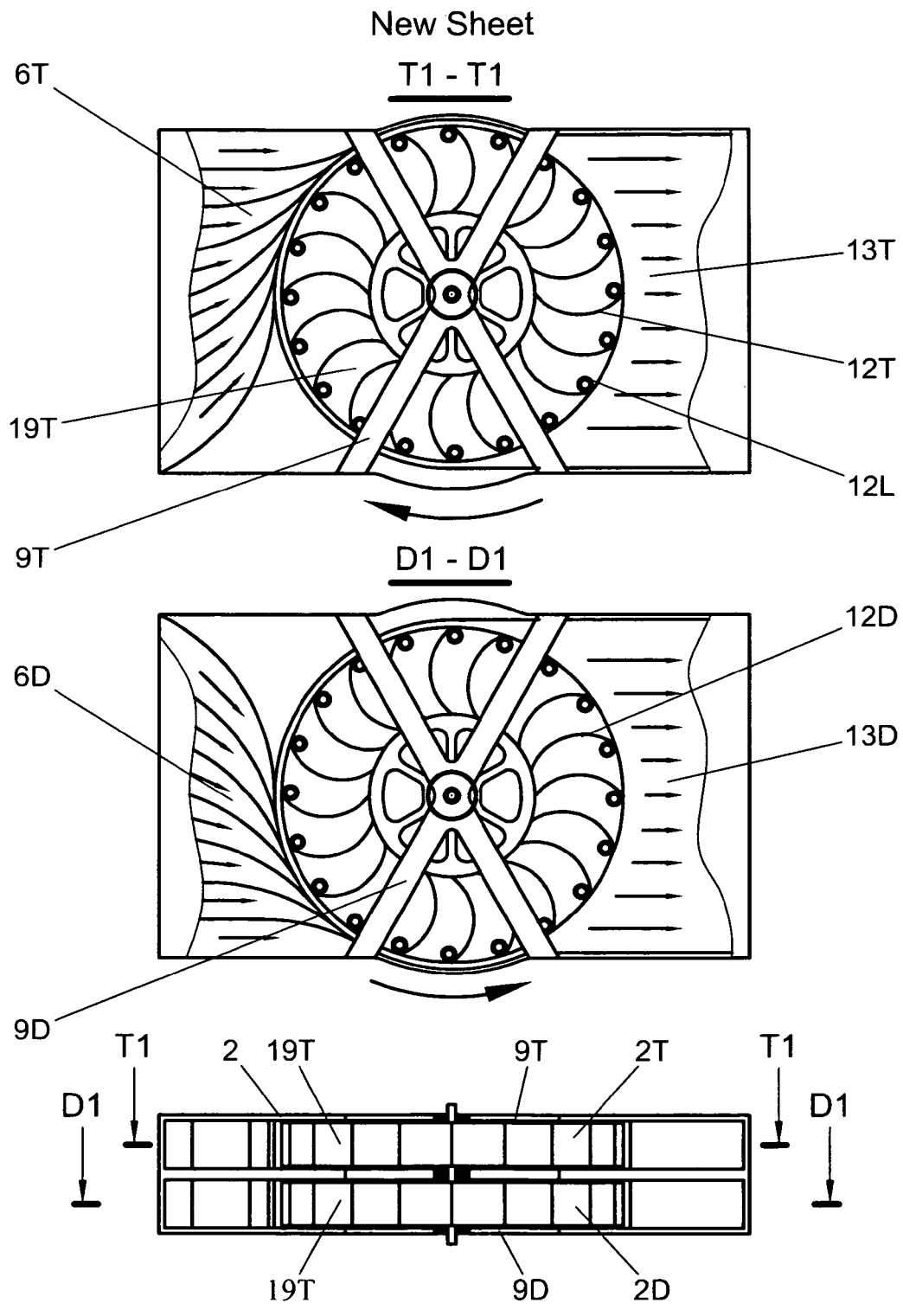
FIG. 3b is plan and lateral sectional views of the truck power installation having two upper turbine units, each containing a turbine, wherein the turbines rotate in opposite direction, according to a preferred embodiment of the invention.

FIG. 3 illustrates a portion of the airflow power installation represented by an upper turbine unit mounted in the upper turbine box-section 2. The upper turbine unit comprises: a horizontally disposed turbine casing 7; intake channels 6; discharge channels 13; two X-shaped support members 9 disposed in parallel horizontal planes; support bearings disposed in the centers of the members 9; a horizontal turbine (19) fixed on a vertically disposed turbine shaft rotatably mounted on the support bearings; a belt gear having a driving pulley 11 fixed on the turbine shaft, and a driven pulley 14 associated via the belt 10 with the pulley 11. The turbine 19 includes a flywheel (not shown), and a plurality of blades 12 having an aerodynamic shape. All elements of the upper turbine unit are preferably performed similar to their aforesaid counterparts of the lateral turbine unit, except for the horizontal positioning of the corresponding elements of the upper turbine unit.

In an optional embodiment, the turbine unit (especially the upper turbine unit) may comprise two turbine casings each containing two X-shaped members secured within the casing, and each containing a horizontally disposed turbine mounted between the X-shaped members on separate shafts. The intake channels and the orientation of the turbine blades are so arranged that the two horizontal turbines revolve in two mutually opposite directions thereby providing compensation of opposite reaction moments developed in the two turbines. The optional embodiment is depicted on FIG. 3b that illustrates the upper turbine box-section 2 containing two turbine units: a top turbine unit (2T) and a down turbine unit (2D). The top turbine unit 2T comprises: a number of intake channels 6T air of X-shaped support structural members (9T), and a top turbine (19T) having blades (12T) and essentially supported by the members 9T. The down turbine unit 2D comprises: a number of intake channels (6D), a pair of X-shaped support structural members (9D), and a down turbine (19D) having blades (12D) and essentially supported by the members 9D. The turbines 19T and 19D are rotatably mounted on separate shafts. Due to opposite arrangements of the intake channels 6T and 6D, and of their blades 12T and 12D, the turbines 19T and 19D rotate in opposite directions as shown on FIG. 3b.

Figure 4:
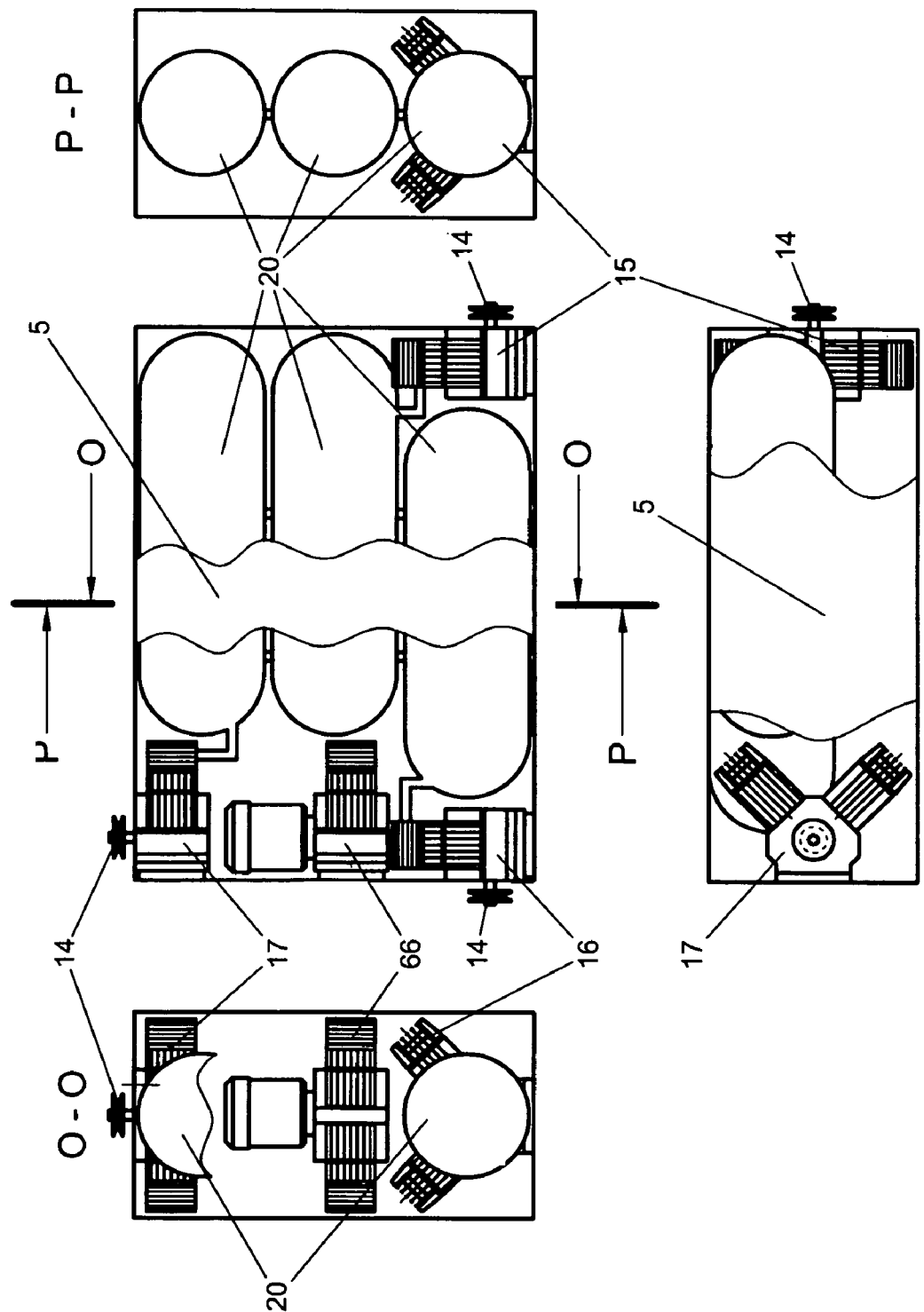
FIG. 4 is a front, side, and plan sectional views of a box-section, containing compressor pumps and tanks for storage of compressed air, which box-section is a part of the truck power installation, according to a preferred embodiment of the invention.
Figure 4A:
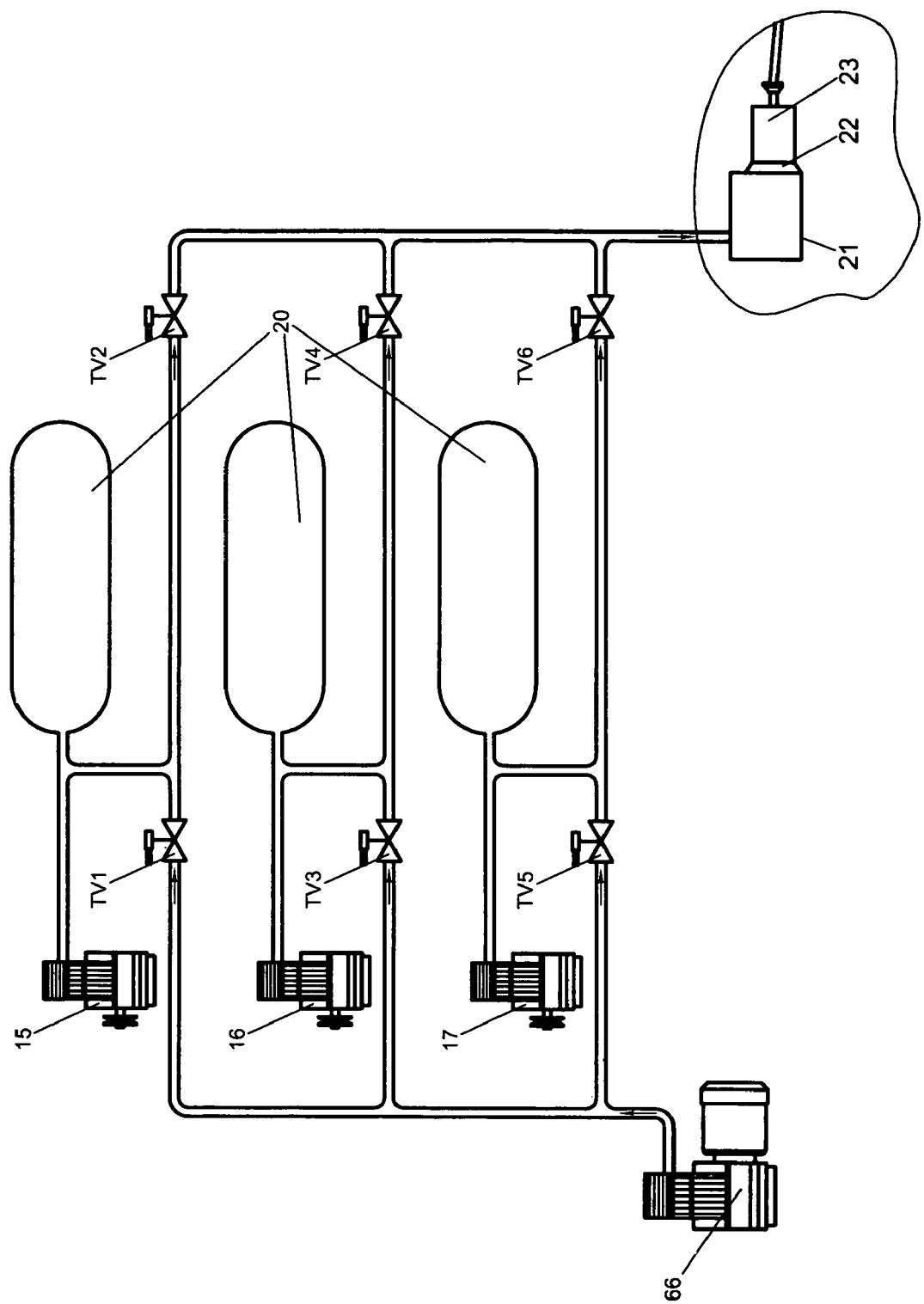
FIG. 4a is a scheme of connections of the compressor air equipment, pneumo-motor, its transmission, etc., shown on FIG. 4.

FIGS. 4 and 4a illustrate a portion of the airflow power installation represented by compressed air equipment contained in the compressor equipment box-section 5. In the illustrated preferred embodiment, the compressed air equipment comprises: a pneumatic motor (21) mechanically connected with power train means of the truck, preferably in the form of a muff (22) controllably coupled with a transmission (23), which power train means drive the truck's wheels at certain conditions; a right side turbine air-compressor (supercharger) pump (15); a left side turbine air-compressor (supercharger) pump (16); an upper turbine air-compressor (supercharger) pump (17); and a number (at least one) of tanks (20) designed for storage or compressed air at a predetermined pressure range.

The tanks 20 may communicate to each other forming a common tank (not shown) of several sections. However, the tanks 20 should preferably be separated from each other that increases reliability of the power installation in case one of the tanks fails. Each tank 20 is preferably furnished with a pressure sensor (55) (shown on FIGS. 7 and 8) connected to the aforesaid control system. The air compressor pumps, each has a corresponding pump shaft. Each driven pulley 14 of the corresponding belt gear is fixed on the respective pump shaft. For example, the pump shaft of the air-compressor pump 15 (shown on FIG. 4) of the right side turbine is coupled with the driven pulley 14 of the belt gear associated with the right vertical turbine 8 (shown on FIG. 2). In some embodiments, the coupling between the driven pulleys and the pumps 15, 16, and 17 can be provided through a clutch (not shown).

The air-compressor pumps 15, 16, and 17 are connected with the tanks 20 (three such tanks are shown on FIG. 4). Each pump may be connected to one, or two, or three tanks, preferably via check valves (not shown) that can be opened at a predetermined pressure and controlled by the control system. On the other hand, the tanks 20 are connected with the pneumatic motor 21 via check valves (TV2), (TV4), and (TV6) controlled by the control system.

Initially, the tanks 20 are filled up with compressed air pumped by an additional on-board air-compressor (66), shown on FIG. 4a, including an electric motor, according to a preferred embodiment. The pumping of the tanks with compressed air by the additional air-compressor 66 is provided via check valves (TV1), (TV3), and (TV5), controlled by the control system. The additional air-compressor 66 can be powered up from a regular electric grid (e.g. established at parking facility) or from a board electric system of the same or another transportation means, etc. Optionally, the additional air-compressor can be mounted on parking facilities (not shown), or in other suitable places, and connected to the tanks of power installation through a hose, or a similar means.

Figure 8:
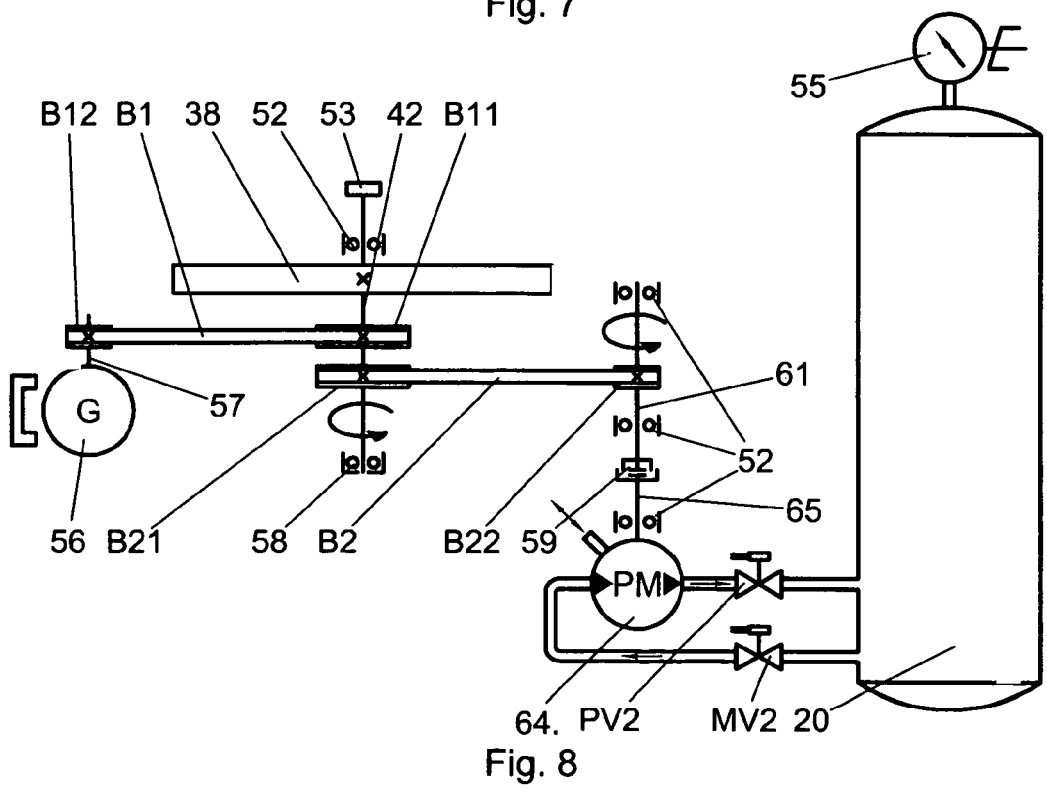
FIG. 8 is a schematic view of a second version of a pneumo-electrical power conversion system particularly usable with the truck and stationary power installations, according to a preferred embodiment of the invention.

Alternatively, the pneumatic motor 21 can be adapted for operation as a combined electric pump-motor (not shown): in a pneumo-motor mode (driving the truck, powered up by the compressed air from the tanks 20) and in a compressor mode (supercharging the tanks 20, while powered up from an electric system), i.e. it can substitute the additional on-board compressor 66 performing its function. A similar embodiment is illustrated on FIG. 8, described herein below, but differs in that the combined pump-motor, shown on FIG. 8, is associated with the turbine shaft and in the compressor mode is powered up by the rotation of the shaft, whereas the adapted version of the combined pump-motor is powered up from an electric system in the compressor mode.

The truck-based power installation operates as follows: the tanks 20 are initially filled with compressed air as described above. The pumping of compressed air is performed until a predetermined pressure (measured by the corresponding sensors 55 and conveyed to the control system) in the tanks 20 has been reached. The pneumo-motor 21 drives the transmission 23 that rotates the wheels of the truck and it starts moving. The resistance airflow enters the intake channels 6, rotates the vertical turbines 8 and the horizontal turbine 19, the driving pulleys 11 and the driven pulleys 14 substantially coupled with the corresponding turbines. At a certain speed of the truck and depending on the pressure in the tanks 20, the control system opens the valves of the pumps 15, 16, and 17 that start supercharging the tanks 20.

In some embodiments, the pneumo-motor 21 can be powered by compressed air from the tanks 20 in a combining mode, i.e. simultaneously with the supercharging of the tanks 20 by the pumps 15, 16, and 17. When the pressure in the tanks 20 decreases below a predetermined threshold, the control system issues a signal for recharging the tanks that can be provided in one of the aforementioned ways. The control system may also be capable to show an approximate number of miles (kilometers) left until the power installation would stop operating.

Optionally, compressed air from the tanks 20 can be used not only for moving the transportation means, but also adapted for various equipment on board, such as for rotation of an electric generator, oil pumps, pneumatic power tools, etc., which rotation is provided for example by the pneumo-motor 21, or by an additional pneumo-motor (not shown) controllably pneumatically connected with the tanks 20.

The truck-based power installation can be regarded as pollution-free, since initially powered from an electric system, and then from the resistance airflow during the movement of the truck and powered by compressed air from the storage tank. Where properly adapted, the above-described design principles can be applied to other types of motor vehicles, trains, boats, aircraft, etc.

Truck-Based Hybrid Power Installation

Figure 5:
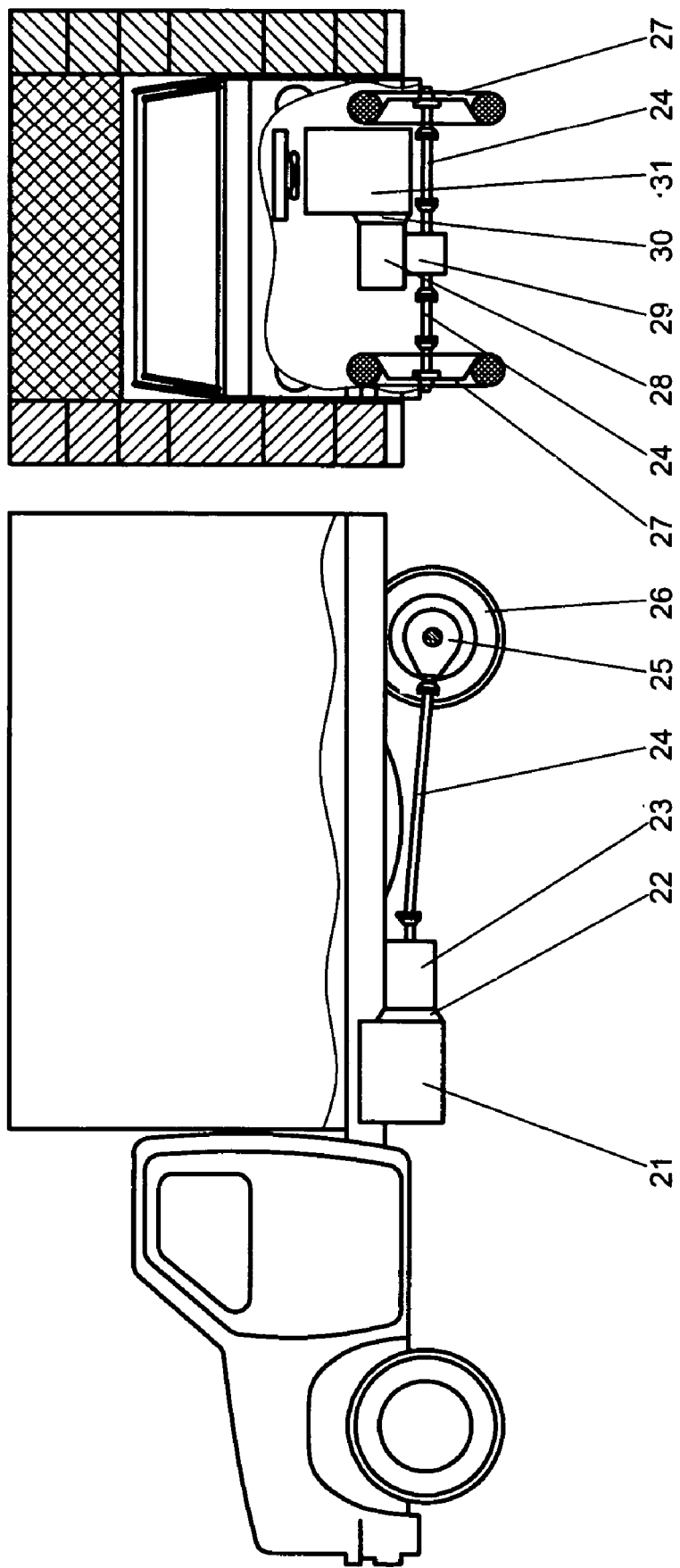
FIG. 5 is a schematic side view and a front sectional view of power units and power train of a truck-based hybrid power installation, according to a preferred embodiment of the invention.

The present invention may be embodied in another version further called a truck-based hybrid installation illustrated on FIG. 5. Essentially, it encompasses the above-disclosed units and equipment elements, except for an additional fueled engine (e.g. a common combustion engine) with a fuel tank, and different power train means. The fueled engine and fuel tank are mounted on the truck.

The truck-based hybrid installation thus comprises a number of box-sections, containing at least one turbine unit (preferably two vertical and one horizontal as discussed above), air-compressor and storage equipment (as described above) respectively associated with the turbine units.

The truck-based hybrid installation comprises a pneumo-motor 21 associated with the air-compressor and compressed air storage equipment (as described above), a pneumo-motor muff (22) having a first side connected the pneumo-motor 21, and having a second side connected to a pneumo-motor transmission 23, a cardan shaft (24) coupled to the transmission 23, a pneumo-motor differential mechanism (25) coupled to the cardan shaft 24, a rear driving wheel (26) associated with the differential mechanism 25.

The truck-based hybrid installation comprises a combustion engine (31) associated with an engine muff (30) having a first side connected the engine 31, and having a second side connected to an engine transmission (28), an engine differential mechanism (29) coupled to the engine transmission 28 and to the cardan shaft 24, a front driving wheel (27) coupled to the cardan shaft 24. In alternative embodiments, the combustion engine can be associated with the rear wheel through its muff, whereas the pneumo-motor can be associated with the front wheel through its muff.

The truck-based hybrid installation exemplarily operates as follows: the tanks 20 are initially filled with compressed air as described above. The pumping of compressed air is performed until a predetermined pressure (measured by the corresponding sensors 55 and conveyed to the control system) in the tanks 20 has been reached. The pneumo-motor 21 drives the transmission 23 that essentially rotates the rear wheels 26 of the truck and it starts moving. The resistance airflow enters the intake channels 6, rotates the vertical turbines 8 and the horizontal turbine 19, the driving pulleys 11 and the driven pulleys 14 substantially coupled with the corresponding turbines. At a certain speed of the truck and depending on the pressure in the tanks 20, the control system opens the valves of the pumps 15, 16, and 17 that start supercharging the tanks 20. At this point, the valves controlling the airflow from the tanks 20 to the pneumo-motor 21 are shut off. At the same time, the control system may ignite the engine 31, and the movement of the truck is further driven by the combustion engine essentially rotating the front wheels 27. Simultaneously the tanks are supercharged by the pumps 15, 16, and 17 that continue powering from the corresponding pulleys rotated substantially by the corresponding turbines. At lower speed, the installation can be, for example, powered up by compressed air driving the pneumo-motor 21 and the rear wheels 26, while at high speed the installation can be, for example, powered up by the engine 31 driving the front wheels 27.

Optimization of operation modes of the truck-based hybrid installation can be accomplished by testing a certain embodiment of the installation in a wide range of speeds on highways and on urbane streets, analyzing the tests, and properly incorporating the results of the analysis in a computer program for a processor included into the control system. Accordingly, the power installation can be controlled by the pre-programmed computerized control system to achieve best results for efficient consumption of fuel by the engine, and for lowest possible pollution.

When the pressure in the tanks 20 decreases below a predetermined threshold, the control system signals for recharging the tanks that can be provided in one of the above mentioned ways. The control system may also be capable to show an approximate number of miles (kilometers) left until the pneumo-motor would stop operating. In such a case, the truck would be driven only by the combustion engine until the tanks would be recharged with compressed air that can optionally be accomplished based on powering up the aforementioned additional air-compressor 66 from the board electric system of the same truck, or from a different electric power source.

The truck based hybrid power installation can be regarded as a low-pollution power source, since it is powered up from an electric system, from the resistance airflow during the movement of the truck, and from a combustion engine in several combinations. Where properly adapted, the above-described design principles can be applied to other types of motor vehicles, trains, boats, aircraft, etc.

Stationary Wind Airflow Power Installation

Figure 6:
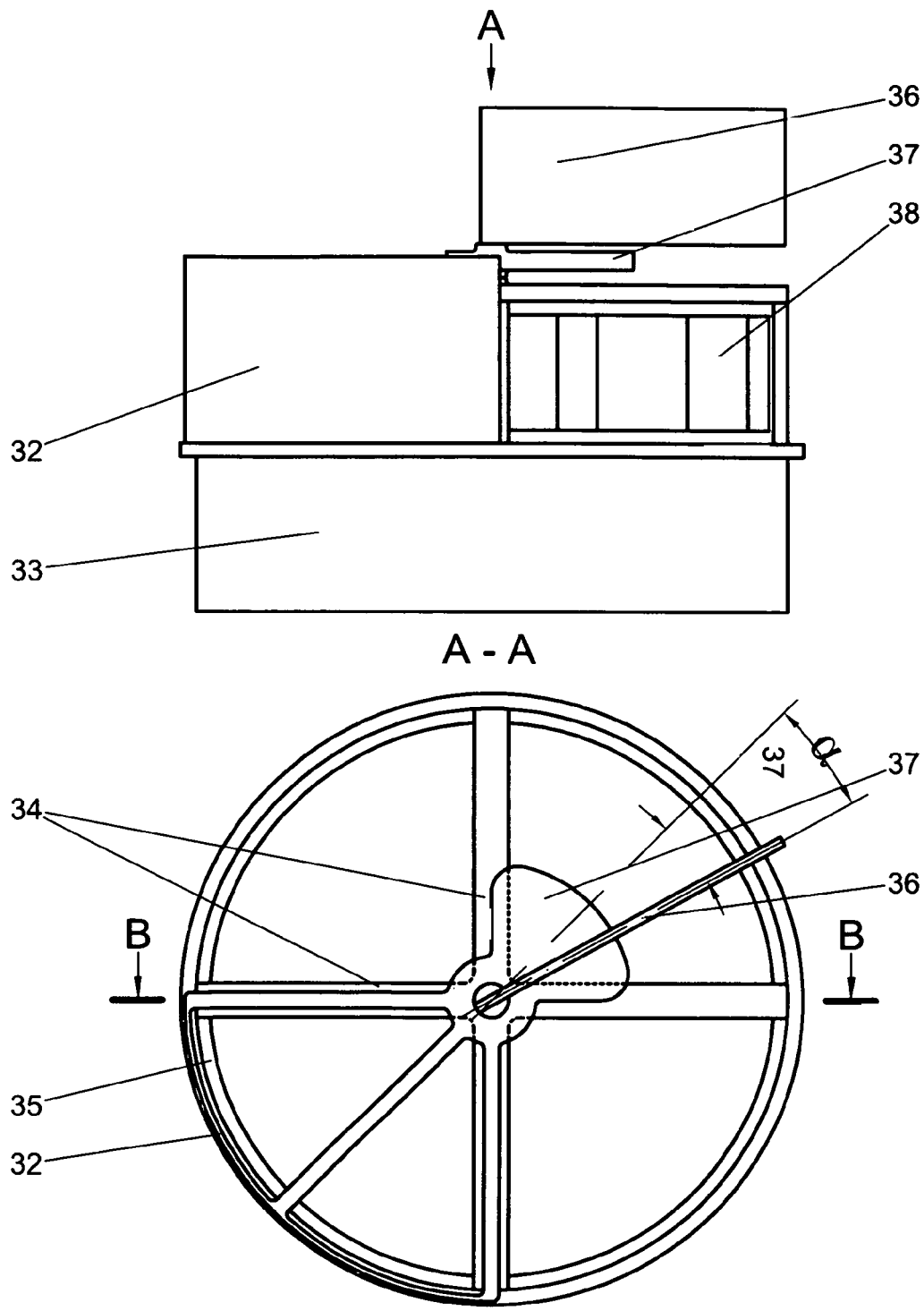
FIG. 6 is a plan view and a front view of a stationary wind airflow power installation, according to a preferred embodiment of the invention.
Figure 6A:
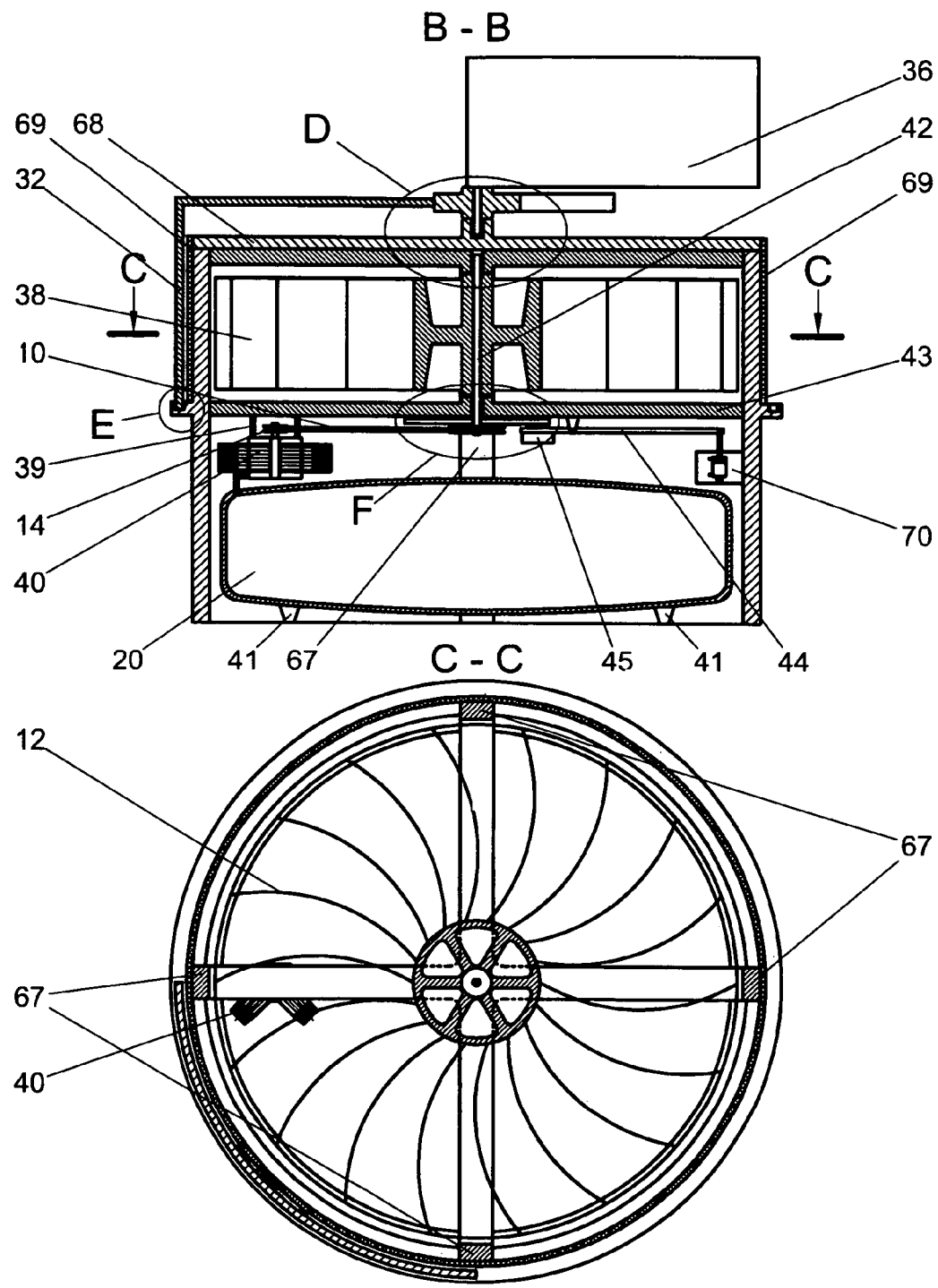
FIG. 6a is a plan sectional view and a front sectional view of the stationary wind airflow power installation, shown on FIG. 6.
Figure 6B:
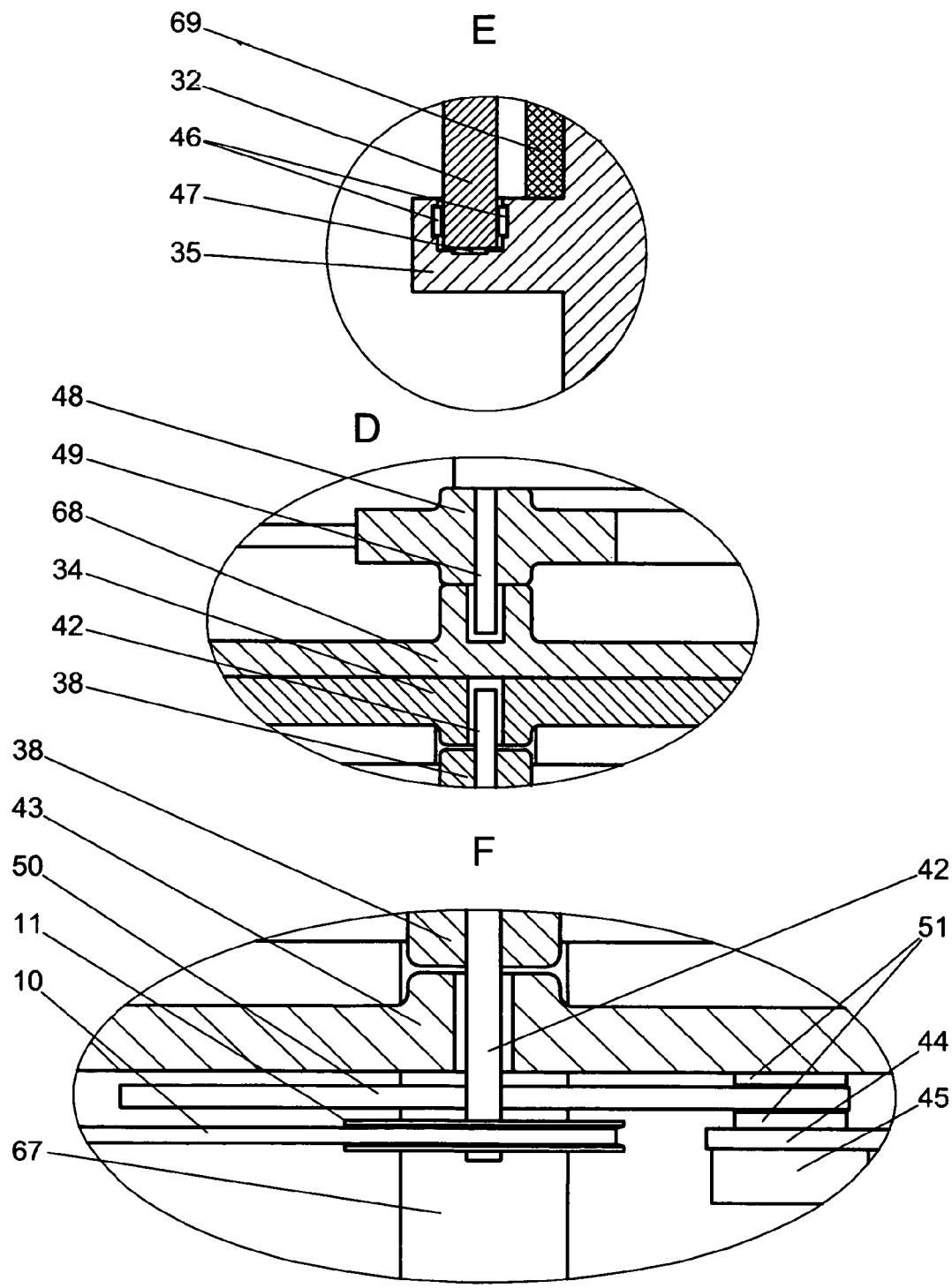
FIG. 6b is detail sectional views of fragments of the stationary wind airflow power installation, shown on FIG. 6.

The present invention may be embodied in another version further called a stationary wind airflow power installation (or SWAPI) illustrated on FIGS. 6, 6a, and 6b. The SWAPI comprises a tower-shaped structure having at least an upper level and a lower level in preferred embodiments. The lower level is represented by a body (35) of a preferably cylindrical shape. The body 35 has a top rim radially protruded from the walls of the body 35. The rim has a groove on its upper surface; a number of guide rollers (46) are peripherally mounted on the vertical inner sides of the groove, and a number of support rollers (47) are peripherally mounted on the bottom of the groove.

The upper level includes a number of columns or polls (67) supporting a roof (68); the inner space of the upper level is peripherally fenced with a net screen (69) to protect the inner space from birds and airborne objects (especially during storms); an upper X-shaped support member (34) horizontally disposed and located under the roof; and a lower X-shaped support member (43) horizontally disposed and located at the floor of upper level. The members 34 and 43 are made similar to the member 9 of the upper turbine unit in the truck-based versions described hereinabove.

The SWAPI comprises support bearings (not shown) disposed in the centers of the members 34 and 43; a horizontal turbine (38) fixed on a vertically disposed turbine shaft (42) rotatably mounted on the support bearings; a belt gear, located in the lower level, having a driving pulley 11 fixed on the turbine shaft 42, and a driven pulley 14 associated via a belt 10 with the pulley 11. The turbine 38 includes a flywheel (not shown), and a plurality of blades 12 having an aerodynamic shape, as described hereinabove.

As shown on FIG. 6b, the SWAPI comprises a top shaft (49) rotatably mounted on a bearing (not shown) in the center of and above the upper member 34.

The SWAPI comprises a shutter (32) including a lateral member shaped as a cylindrical arc segment. FIGS. 6 and 6a exemplarily depict the lateral member formed as a 90.degree arc, though it can be made as an arc of various angles, e.g. a 180.degree arc. The shutter 32 includes a nave (48) fixedly mounted on the shaft 49 and situated above the roof 68; the nave 48 is coupled with top bridge rods that are fixed to the top of lateral arc member of the shutter 32 and supporting the arc member. A shutter counter-load (37) is mounted on the nave 48 situated diameteraly opposite to the arc member. The bottom edge of the arc member is mounted in the groove of the body's top rim, i.e. the arc member is capable of moving along the arc rolling upon the rolls 47 and guided by the rolls 46.

The SWAPI comprises a flat wind vane (36) vertically fixed in a region of one of its lower corners to the nave 48. The plane of vane 36 is preferably situated at a predetermined angle BETTA (shown on FIG. 6) to the arc radius ending at the center of the arc member. The shutter 32 with the vane 36 create an asymmetrical configuration, causing an unequal distribution of the intake wind airflow that effects rotation of the turbine 38 even during a weak wind. In optional embodiments (not shown), the vane 36 may be made capable of controllable changing the BETTA angle until a maximally uneven distribution of the airflow is achieved that results in a higher effectiveness of power conversion.

The SWAPI comprises a tank 20 for storage of compressed air, located at the lower level and mounted on footage (41) to the floor of lower level; and an air-compressor pump (40), preferably secured by brackets (39) to the ceiling of the lower level. The tank 20 is preferably furnished with pressure sensors (not shown) associated with a control system (not shown). The pump 40 is driven by the driven pulley 14 essentially rotated by the turbine shaft 42. The pump 40 is capable of supercharging the tank 20 with compressed air via regulating valves (not shown) under control of the control system.

The SWAPI comprises a brake mechanism preferably attached to the ceiling of the lower level. The brake mechanism includes a disc (50) fixed on the turbine shaft 42 above the driving pulley 11 (as shown on FIG. 6b). The brake mechanism includes a pneumo-cylinder (70) communicated with the tank 20 and mounted preferably vertically on top of the tank, a piston (not shown) slidely mounted within the pneumo-cylinder. The piston is coupled to a rod and capable of vertical displacement upward and downward depending on the air pressure in the tank 20.

The brake mechanism includes a substantially horizontal lever pivotally mounted on an axle (not shown) secured preferably to the ceiling of the lower level. A first end of the lever is attached to the upper end of the rod, and a second end of the lever is furnished with a lower braking plate (51) coupled to its upper surface and located below the disc (50). An upper braking plate 51 (the plates are shown on FIG. 6b) is mounted to the lower X-shaped support member 43 above the disc 50 opposite to the lower braking plate 51. The lever is therefore capable of lifting its second end when the pressure in the tank 20 reaches a predetermined threshold, and depressing the lower braking plate 51 to the disc 50 against the upper braking plate 51, thereby causing the braking and deceleration of the rotation of the turbine shaft 42 up to its full stop.

The SWAPI operates as follows: the wind airflow encounters the vane 36 with the arc member of shutter 32 and turns them at a certain angle depending on its direction and intensity. It creates an asymmetrical configuration causing an uneven distribution of the airflow among the blades 12 of the turbine 38 that starts rotating. The rotation is conveyed from the turbine shaft 42, the gear pulleys 11 and 14 to the pump 40. When the air pressure in the tank 20 is lower than a predetermined lowest threshold, the control system opens the valves for inlet of compressed air from the pump into the tank, until the pressure reaches a predetermined uppermost threshold.

The pressurized air can be utilized for various purposes: e.g., for rotation of a pneumo-motor (not shown on FIGS. 6, 6a, and 6b) that can further drive an electric generator (such a system is exemplified herein further), for power pneumatic tools or for blowing tires (for instance, a car repair shop can be arranged below the lower level of SWAPI), etc.

Pneumo-Electric System of Airflow Energy Conversion—PESAEC

Several embodiments are disclosed in the above-discussed inventive versions of truck-based power installations and SWAPI. Those embodiments are dedicated to conversion of airflow energy into energy of compressed air, and using the compressed air for rotation of a pneumo-motor that can further rotate other mechanisms (e.g. oil pumps, etc.), or immediately for empowering pneumatic tools, and so on.

It is however well known that in most situations the preferable and most convenient type of energy is electric energy. Therefore, it is desirable to complement the above described inventive embodiments with a system capable to convert the airflow energy not only into the energy of compressed air, but also into electric energy generated by an electrical generator. Since the power of airflows often changes following external factors (e.g. the speed of truck for TBAPI, the speed of wind for SWAPI, etc.), the accumulated energy of compressed air may compensate for such changes and provide more stable operation of the generator. Such a system is herein called: a 'PESAEC' (Pneumo-Electric System of Airflow Energy Conversion), two variants of the PESAEC are presented herein below.

PESAEC—First Variant

Figure 7:
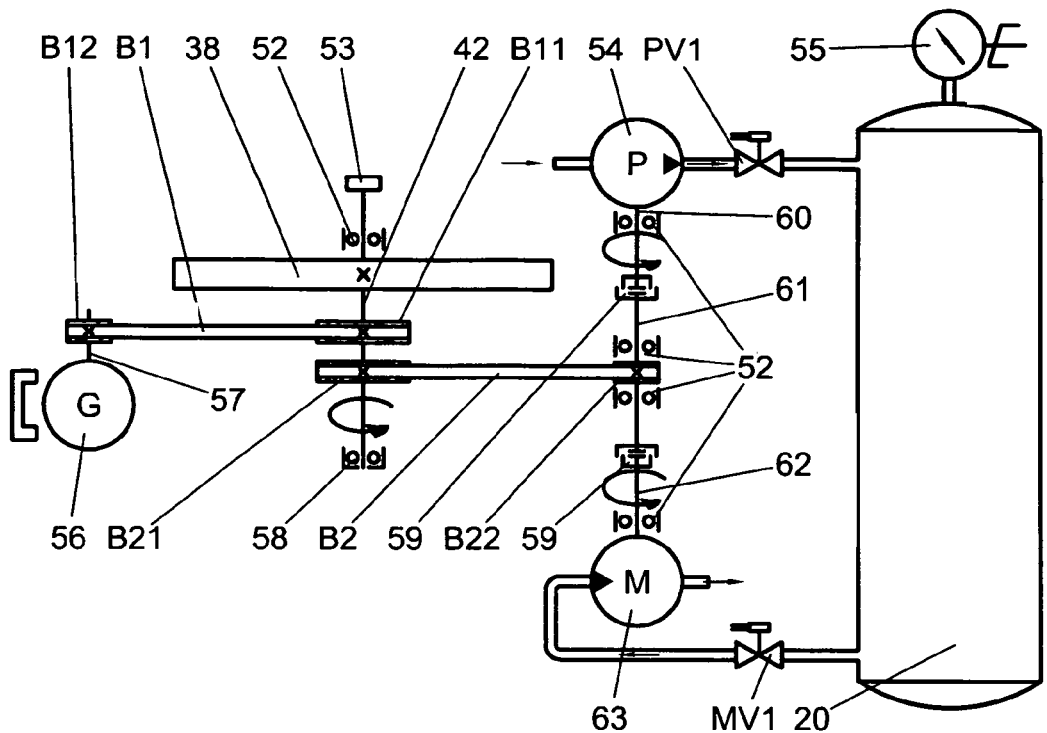
FIG. 7 is a schematic view of a first version of a pneumo-electrical power conversion system particularly usable with the truck and stationary power installations, according to a preferred embodiment of the invention.

Referring to FIG. 7, in the first variant, the PESAEC comprises: an electric generator (56) fixed on a rotatable generator shaft (57); a turbine 38 preferably driven by airflows, fixed on a turbine shaft 42 rotatably supported by bearings (52) and (58); a sensor (53) is so mounted that capable to measure the rotational speed of the turbine 38, the sensor 53 is associated with a computerized control system (not illustrated); a first belt gear (generally, any other suitable type of gear can be used) including a driving pulley B11, connected by a belt B1 with a driven pulley B12, the pulley B11 is fixed on the shaft 42, the pulley B12 is fixed on the generator shaft 57; a second belt gear (generally, any other suitable type of gear can be used) including a driving pulley B21, connected by a belt B2 with a driven pulley B22, the pulley B21 is fixed on the shaft 42, the pulley B22 is fixed on an intermediate shaft (61) supported by bearings 52. A first end of the intermediate shaft 61 is furnished with a first muff (59), which is controllably coupled on its other side to a pump shaft (60). A second end of the intermediate shaft 61 is furnished with a second muff 59, which is controllably coupled on its other side to a motor shaft (62).

The first variant of PESAEC comprises: a tank 20 capable to store compressed air of a predetermined pressure range, the tank 20 is furnished with a pressure sensor (55) associated with the control system; a pump (54) fixed on the pump shaft 60; a pneumo-motor (63) fixed on the motor shaft 62. The pump 54 is connected to the tank 20 via a proportional valve (PV1) associated with the control system. The pneumo-motor 63 is connected to the tank 20 via a proportional valve (MV1) associated with the control system.

The first variant of PESAEC operates as follows: the turbine 38 rotated by airflows through the shaft 42, pulleys B11 and B12, conveys the rotation to the shaft 57 and drives the generator 56 generating electric energy. The turbine 38 through the shaft 42, pulleys B21 and B22, conveys the rotation to the shaft 61.

If the rotational speed of turbine 38 (measured by the sensor 53) provides a predetermined primary power to the generator 56, the control system may disconnect both muffs 59. This may be called a 'plain mode'.

If the rotational speed of turbine 38 (measured by the sensor 53) provides a power greater than the predetermined primary power to the generator 56, the control system may connect the muff 59 engaging the shafts 61 and 60 and this starts driving the pump 54 supercharging compressed air via the valve PV1, which can regulate the airflow into the tank 20 according to a command of the control system, e.g. the higher is the rotational speed, the greater is the supercharging airflow into the tank 20, and vice-versa. The rotational speed of the shaft 42 is thus reduced essentially to the speed corresponding to the predetermined primary power. Therefore, the excessive energy of turbine 38 is accumulated in the form of compressed air in the tank 20. This may be called an 'accumulation mode'.

If the rotational speed of turbine 38 (measured by the sensor 53) provides a power less than the predetermined primary power to the generator 56, the control system may connect the muff 59 engaging the shafts 61 and 62 (and respectively disconnect the muff 59 of the shaft 60 if it was connected) and this starts driving the pneumo-motor 63 consuming compressed air via the valve MV1, which can regulate the airflow from the tank 20 according to a command of the control system, e.g. the lower is the rotational speed, the greater is the consumed airflow from the tank 20, and vice-versa. The pneumo-motor 63 rotates in the direction supporting the rotation of the shaft 42, the pulley B22 becomes a driving pulley, i.e. the pneumo-motor 63 adds its power to the insufficient power of the shaft 42 at the moment. The rotational speed of the shaft 42 is thus increased essentially to the speed corresponding to the predetermined primary power. Therefore, the lack of energy of turbine 38 is compensated at the expense of reducing the pressure of compressed air in the tank 20. This may be called a 'consuming mode'.

PESAEC—Second Variant

Referring to FIG. 8, in the second variant, the PESAEC comprises: an electric generator 56 fixed on a rotatable generator shaft 57; a turbine 38 preferably driven by airflows, fixed on a turbine shaft 42 rotatably supported by bearings 52 and 58; a sensor 53 is so mounted that capable to measure the rotational speed of the turbine 38, the sensor 53 is associated with a computerized control system (not illustrated); a first belt gear (generally, any other suitable type of gear can be used) including a pulley B11, connected by a belt B1 with a pulley B12, the pulley B11 is fixed on the shaft 42, the pulley B12 is fixed on the generator shaft 57; a second belt gear (generally, any other suitable type of gear can be used) including a pulley B21, connected by a belt B2 with a pulley B22, the pulley B21 is fixed on the shaft 42, the pulley B22 is fixed on an intermediate shaft 61 supported by bearings 52. The intermediate shaft 61 is furnished with a muff 58, which is controllably coupled to a pump-motor shaft (65).

The second variant of PESAEC comprises: a tank 20 capable to store compressed air of a predetermined pressure range, the tank 20 is furnished with a pressure sensor 55 associated with the control system; a pump-motor (64) fixed on the pump-motor shaft 65. The pump-motor 64 is a machine combining the functions of a pump and a pneumatic motor (preferably of a rotor type) depending upon an operation regime set by the control system. The pump-motor 64 is connected to the tank 20 via a proportional valve (PV2) associated with the control system, and via a proportional valve (MV2) associated with the control system. The pump-motor 64 is capable of operating as a pump supercharging the tank 20 with compressed air when the valve PV2 is open and the valve MV2 is closed (pump regime), and as a pneumo-motor consuming compressed air from the tank 20 when the valve MV2 is open and the valve PV2 is closed (motor regime). In any regime, the pump-motor 64 rotates in the same single direction.

The second variant of PESAEC operates as follows: the turbine 38 rotated by airflows through the shaft 42, pulleys B11 and B12, conveys the rotation to the shaft 57 and drives the generator 56 generating electric energy. The turbine 38 through the shaft 42, pulleys B21 and B22, conveys the rotation to the shaft 61.

If the rotational speed of turbine 38 (measured by the sensor 53) provides a predetermined primary power to the generator 56, the control system may disconnect the muff 59. This may be called a 'plain mode'.

If the rotational speed of turbine 38 (measured by the sensor 53) provides a power greater than the predetermined primary power to the generator 56, the control system may connect the muff 59 engaging the shafts 61 and 65 and this starts driving the pump-motor 64 operating in the pump regime and supercharging compressed air via the valve PV2, which can regulate the airflow into the tank 20 according to a command of the control system, e.g. the higher is the rotational speed, the greater is the supercharging airflow into the tank 20, and vice-versa. The rotational speed of the shaft 42 is thus reduced essentially to the speed corresponding to the predetermined primary power. Therefore, the excessive energy of turbine 38 is accumulated in the form of compressed air in the tank 20. This may be called an 'accumulation mode'.

If the rotational speed of turbine 38 (measured by the sensor 53) provides a power less than the predetermined primary power to the generator 56, the control system may connect the muff 59 engaging the shafts 61 and 65 and this starts driving the pneumo-motor 63, operating in the motor regime and consuming compressed air via the valve MV2, which can regulate the airflow from the tank 20 according to a command of the control system, e.g. the lower is the rotational speed, the greater is the consumed airflow from the tank 20, and vice-versa. The pump-motor 64 rotates in the same single direction supporting the rotation of the shaft 42, the pulley B22 becomes a driving pulley, i.e. the pump-motor 64 adds its power to the insufficient power of the shaft 42 at the moment. The rotational speed of the shaft 42 is thus increased essentially to the speed corresponding to the predetermined primary power. Therefore, the lack of energy of turbine 38 is compensated at the expense of reducing the pressure of compressed air in the tank 20. This may be called a 'consuming mode'.

Both the first and the second variants of PESAEC can be combined with and deployed by the above-discussed inventive versions of truck-based power installations and SWAPI for controllable conversion of the airflow energy into electric energy.

I claim:

1. A power installation for conversion of energy of resistance airflow appearing during a movement of a transportation means, said transportation means including power train means, said power installation comprising:
- a number of box-sections secured on the transportation means in at least one of the following parts thereof: a roof, a bottom, a left wall, and a right wall of said transportation means; at least one of said box-sections containing a turbine unit, said turbine unit including:
  - at least one casing secured to the box-section, said at least one casing has a surface,
  - a number of intake channels arranged in the box-section, each said intake channel having an inlet opening for receiving said resistance airflow and an outlet opening located on the surface of said casing,
  - a number of discharge channels arranged in the box-section for exhaust of the airflow passed through the turbine unit,
  - a pair of support structural members having an X-shape with a central cross point thereof, said support members are substantially secured to the box-section or to the body of said transportation means,
  - a turbine mounted in said casing, said turbine including a turbine shaft rotatably supported by said pair of support structural members in the central cross point thereof, a plurality of blades having a predetermined aerodynamic shape, and
  - a gear means for conveying rotation of said turbine, said gear means associated with said pair of support structural members;
- an air compressor means arranged on the transportation means, said air compressor means are driven by said gear means;
- compressed air storage means arranged on the transportation means, said air storage means pneumatically associated substantially with said air compressor means; and
- a pneumatic motor arranged on the transportation means, said pneumatic motor is coupled with said power train means, and said pneumatic motor is pneumatically controllably associated substantially with said air storage means.

2. The power installation according to claim 1, wherein at least a portion of each blade of said plurality of blades is furnished with a load means.

3. The power installation according to claim 1, wherein the at least one of said box-sections includes an upper turbine box section disposed in said roof, said upper turbine box section contains two turbine units: a first turbine unit including first intake channels, and a second turbine unit including second intake channels arranged in an opposite order relatively to the first intake channels; said first turbine unit has a first turbine including first blades, and said second turbine unit has a second turbine including second blades arranged in an opposite direction relatively to the first blades; the first turbine and the second turbine are mounted on separate shafts; wherein said first turbine and said second turbine rotate in opposite directions due to the arrangements of said first and said second intake channels and of said first and said second blades.

4. The power installation according to claim 1, wherein said pneumatic motor is additionally adapted to power equipment on board of said transportation means.

5. The power installation according to claim 1, further comprising:
- a first muff controllably connecting said pneumatic motor to said power train means;
- an additional fueled engine mounted on said transportation means; and
- a second muff controllably connecting said fueled engine to said power train means.

* * * * *